United States Patent
Barel et al.

(10) Patent No.: US 12,524,100 B2
(45) Date of Patent: Jan. 13, 2026

(54) STYLUS UPLINK ENHANCEMENT FOR TOUCHSCREEN DEVICES

(71) Applicant: Microsoft Technology Licensing, LLC, Redmond, WA (US)

(72) Inventors: Eliyahu Barel, Rosh HaAyin (IL); Arie Yehuda Gur, Kiryat Ono (IL); Ilan Geller, Pardesiya (IL)

(73) Assignee: Microsoft Technology Licensing, LLC., Redmond, WA (US)

(*) Notice: Subject to any disclaimer, the term of this patent is extended or adjusted under 35 U.S.C. 154(b) by 0 days.

(21) Appl. No.: 18/000,427

(22) PCT Filed: May 4, 2021

(86) PCT No.: PCT/US2021/030557
§ 371 (c)(1),
(2) Date: Dec. 1, 2022

(87) PCT Pub. No.: WO2021/247179
PCT Pub. Date: Dec. 9, 2021

(65) Prior Publication Data
US 2023/0350514 A1      Nov. 2, 2023

(30) Foreign Application Priority Data
Jun. 5, 2020  (EP) .................................... 20178617

(51) Int. Cl.
*G09G 5/00*      (2006.01)
*G06F 3/041*      (2006.01)

(52) U.S. Cl.
CPC ................ *G06F 3/04162* (2019.05)

(58) Field of Classification Search
CPC .................................................. G06F 3/04162
See application file for complete search history.

(56) References Cited

U.S. PATENT DOCUMENTS

| 8,507,811 B2 | 8/2013 | Hotelling et al. |
| 9,817,491 B2 | 11/2017 | Rebeschi et al. |
| 2012/0105361 A1 | 5/2012 | Kremin et al. |
| 2014/0320445 A1 | 10/2014 | Kim et al. |
| 2014/0375575 A1 | 12/2014 | Kwon et al. |

(Continued)

FOREIGN PATENT DOCUMENTS

| EP | 2662756 A1 | 11/2013 |
| EP | 3182259 A1 | 6/2017 |

OTHER PUBLICATIONS

"Extended Search Report Issued in European Patent Application No. 20178617.5", Mailed Date: Oct. 9, 2020, 8 Pages.

(Continued)

*Primary Examiner* — Jennifer T Nguyen
(74) *Attorney, Agent, or Firm* — Barta Jones, PLLC

(57) ABSTRACT

An apparatus and method for compensating the effect of a contact by a hand or other body part of a user with a touch screen of a host device while holding an input device on the strength of a capacitively coupled uplink signal provided to the input device (e.g. stylus) by the host device. The compensation is achieved by applying an antiphase signal on a selective contact area (e.g. under a palm area), to increase an overall induced signal collected by the input device from digitizer-to-pen and palm-to-pen paths.

20 Claims, 5 Drawing Sheets

(56) References Cited

U.S. PATENT DOCUMENTS

| | | | |
|---|---|---|---|
| 2016/0062519 A1 | 3/2016 | Park et al. | |
| 2017/0187551 A1* | 6/2017 | Lukanc | H04W 52/0235 |
| 2017/0285771 A1* | 10/2017 | Jung | G06F 3/0383 |
| 2017/0344174 A1* | 11/2017 | Pant | G06F 3/0441 |
| 2019/0146602 A1* | 5/2019 | Kadowaki | G06F 3/0383 |
| | | | 345/174 |
| 2019/0171320 A1* | 6/2019 | Kim | G06F 3/04184 |
| 2019/0235646 A1* | 8/2019 | Karsuntsev | G06F 3/0383 |
| 2020/0042114 A1 | 2/2020 | Kadowaki et al. | |

OTHER PUBLICATIONS

"International Search Report and Written Opinion Issued in PCT Application No. PCT/US21/030557", Mailed Date: Aug. 19, 2021, 12 Pages.

* cited by examiner

STYLUS UPLINK ENHANCEMENT FOR TOUCHSCREEN DEVICES

BACKGROUND

Electronic devices, especially tablets or smart phones, may accept input via handheld peripheral input devices, such as a pen or stylus, and may then act as host devices to the input devices. The input device may be held manually by a user in relation to a touch screen to provide input to the electronic device. Positions of the input device over the touch screen are correlated with virtual information portrayed on the touch screen. A touch position of the input device can be detected due to a small change in capacitance at a contact point on the touch screen.

SUMMARY

This Summary is provided to introduce a selection of concepts in simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

According to an aspect, the disclosure in some embodiments relates to an apparatus for controlling transmission of an uplink signal from a host device of a touch-sensitive device to a touch input device.

A touch detector may be provided for detecting a body touch on the touch-sensitive device by a user body portion.

Furthermore, an uplink signal modulator may be provided for changing a phase angle of the uplink signal to obtain an antiphase signal.

Additionally, a driver circuit may be provided for selectively applying the antiphase signal to a body touch area in response to a detected body touch.

According to another aspect, a host device comprises the above apparatus of the first aspect.

According to a further aspect, a method of controlling transmission of an uplink signal from a host device of a touch-sensitive device to a touch input device may be provided.

A body touch on the touch-sensitive device by a user body portion may be detected.

A phase angle of the uplink signal may be changed to obtain an antiphase signal.

The antiphase signal may selectively be applied to a body touch area in response to a detected body touch.

Unless otherwise defined, all technical and/or scientific terms used herein have the same meaning as commonly understood by one of ordinary skill in the art. Although methods and materials similar or equivalent to those described herein can be used in practice or testing of embodiments of the disclosure, example methods and/or materials are described below. In addition, the materials, methods, and examples are illustrative only and are not intended to be necessarily limiting.

BRIEF DESCRIPTION OF THE DRAWINGS

To assist understanding of the present disclosure and to show how embodiments of such may be put into effect, reference is made, by way of example only, to the accompanying drawings in which.

DETAILED DESCRIPTION OF EMBODIMENTS

The present disclosure is directed to an adaptive uplink signal modification for a touch-sensitive display system.

Figure 1:
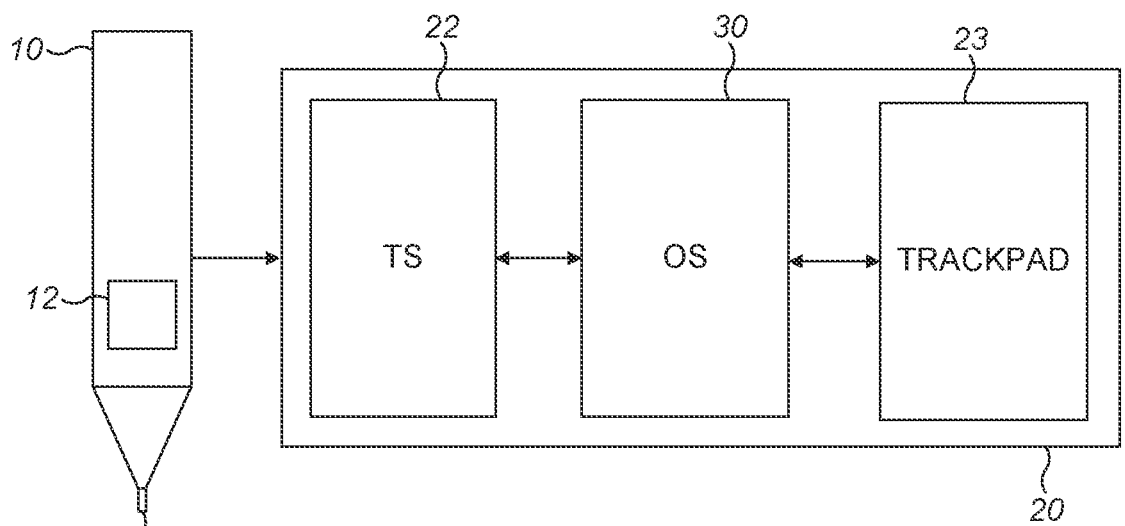
FIG. 1 is a schematic block diagram of an example system comprising a stylus and a host device.

FIG. 1 is a schematic illustration of an example system comprising a host device 20 (e.g. an electronic device with a touch-sensitive display device, including a smart phone, a tablet, a watch, a desktop computer, a gaming device, a wearable device, a television, a video conferencing system, a laptop or notebook with touchscreen and/or trackpad, etc.) and a hand-held stylus peripheral ("stylus") 10 with an input/output unit 12 for receiving an uplink signal received from the host device 20. Furthermore, the stylus 10 may comprise a pressure sensor (not shown) configured to sense a pressure or force applied to a tip electrode 14 of the stylus 10. The stylus may be capable of transmitting output data (e.g. measured pressure or force data) of the pressure sensor to the host device 20 via a downlink signal. The host device 20 comprises a touch screen (TS) 22 (touch-sensitive display), a trackpad 23, and an operating system (OS) 30. The OS 30 controls the touch screen 22 and the trackpad 23.

The stylus 10 is used to communicate user input to the host device 20. The touch screen 22 may include a built-in digitizer to sense signals transmitted from the stylus 10. A user interacts with the digitizer by positioning and moving the tip electrode 14 of the stylus 10 over a sensing surface of the touch screen 22. The position of the tip electrode 14 of the stylus 10 with respect to the sensing surface is tracked by the digitizer and interpreted as a user command. In some technologies, the position of the stylus 10 can be determined based on detection of capacitive coupling between the tip electrode 14 of the stylus and one or more electrodes of the digitizer. For example, the touch screen 22 may include a digitizer with a plurality of X and Y oriented conductors (e.g. antennas) or a resistive film to receive downlink signals transmitted from the tip electrode 14 of the stylus 10. To accurately identify the tip position, the transmitting electrode is, in some technologies, physically positioned within the writing tip electrode 14 of the stylus 10.

The stylus 10 can be classified as a passive stylus or an active stylus. A passive stylus utilizes sensing methods based on changes in the capacitive coupling between sensor electrodes deposited on a touch-screen sensor and an input object, such as a rubber-tipped stylus. In contrast, an active stylus drives unique modulated downlink signals between the tip electrode 14 of the stylus 10 and a grid or matrix of electrodes of a touchscreen sensor of the digitizer and utilizes sensing methods based on changes in the capacitive coupling between sensor electrodes. The digitizer detects at least one position of the stylus 10 based on the downlink signal emitted and the detected position provides input to the host device 20 associated with the digitizer. The detected position may then be interpreted as user commands. Often, the digitizer may be integrated with touch screen 22, e.g., to form a touch-sensitive display device.

The stylus 10 may further comprise a force or pressure sensor (not shown) with an optional force or pressure response circuit (not shown), which may collectively be referred to as the inking system. The inking system detects force or pressure applied to the tip electrode 14, optionally increases force or pressure sensitivity, converts the detected force or pressure to an output value (e.g. reported (inking) level) and communicates the output value to the host device 20 for digital ink weighting. One of the features of digital ink is force/pressure sensitivity which allows line thickness control by the user of the stylus 10.

The stylus 10 may further include one or more buttons (not shown) for changing operational modes of the stylus. For example, when button is depressed a signal communicated to the host device may inform the host device that the stylus 10 is in an erasure mode. Furthermore, such operational modes may indicate a color of the digital ink, writing patterns (e.g., dotted lines), writing utensil (e.g., brush, pen, marker, pencil). The detected force or pressure may be indicated with different operational modes. For example, when in an erasure mode, the detected force or pressure may indicate an erasure thickness. The buttons may also be used to initiate a device pairing with the host device 20.

In examples, the stylus body may be formed of a material suitable for enclosing the components described herein. The stylus body may be formed from, for example without limitation, plastic, rubber, metal, carbon fiber, etc. and/or any combinations thereof.

If the stylus 10 is an active stylus it may generate a modulated downlink signal that may be detectable by the digitizer. The signal may be encoded with information such as the device identification, operational mode (e.g., writing, erasing), pressure/force information, tilt information, and other information. The information may be allocated to various portions of the signal.

If the stylus 10 is a passive stylus, it may utilize sensing methods based on changes in the capacitive coupling between sensor electrodes deposited on a touch-screen sensor and an input object, such as a rubber-tipped stylus. In such implementations, the stylus 10 may communicate detected pressure/force information to the host device 20 using communication protocols such as Wi-Fi, Bluetooth, etc.

The information (e.g., pressure/force information) transmitted by the stylus 10 is detected by the host device 20 and used to provide functionality in the display of the host device 20. For example, the host device 20 may detect that the stylus 10 is in a writing mode with identifiable pressure/force information. The host device 20 can use that information (in combination with position information detected through the digitizer) to display digital ink with a thickness or color dependent on the pressure/force information encoded in the signal. For example, a light touch may indicate a relatively finer or lighter line should be draw on the display of the touch screen 22. As the user increases pressure/force on the stylus 10, the weight (e.g. darkness or thickness) of the line may increase accordingly.

Thus, downlink transmission of information is achieved by electrostatic communication from the stylus 10 to the digitizer of the host device 20, wherein the digitizer is configured to extract the position of the stylus based on the downlink signal and the stylus 10 may modulate data on the downlink signal to transmit a pen identity, a force applied on its tip electrode 14, pressure levels, a button indication, etc.

Additionally, uplink transmission of information is achieved via a communication link from the digitizer of the host device 20 to the stylus 10. The uplink transmission link can be used by the stylus 10 to improve performance by acquiring e.g. digitizer timing and cycle length to be able to ink on the display of the host device 20 and/or receiving data from the digitizer, e.g., which frequency shall be used to transmit the downlink signal (e.g. in a frequency hopping scheme), which stylus shall be addressed in a multi-stylus system, haptic feedback (discrimination between inking and hoovering).

As an example, a touch screen driving signal may be applied to the touch screen 22. The touch screen driving signal may include an uplink signal for synchronization with the stylus 10 and a touch sensor driving signal for sensing a touch input applied to the touch screen 22. When the stylus 10 is brought into contact with the touch screen 22, the stylus 10 receives the uplink signal from the touch screen 22, generates a downlink signal (i.e. pen driving signal) in synchronization with the touch sensor driving signal on the basis of the uplink signal and outputs the generated downlink signal to the touch screen 22 e.g. through the tip electrode 14. Since the downlink signal is synchronized with the touch sensor driving signal, it serves to increase sensitivity of the touch sensor driving signal.

However, in a case a palm or other body portion of a user touches the touch screen 22 together with the stylus 10, a problem arises in that reception of the uplink signal at the stylus 10 might be degraded. Here, the palm may be either a palm of a hand gripping the stylus 10 or a hand without the stylus 10. In this case, synchronization of the stylus 10 with the touch screen 22 may be interfered so that its operation can be disrupted.

In a grounded mode, the host device 20 and/or digitizer are grounded (i.e. connected to ground or reference potential) e.g. when the host device 20 is placed on user knees or table, while a palm of a user's first hand rests on the touch screen 22 and his/her second hand grips the chassis or edge of the host device 20.

In a floated or ungrounded mode, the host device 20 is placed on a non-conducting table or other dielectric substrate, while the palm of a user's first hand rests on the touch screen 22 and his/her second hand does not grip the host device 20.

Figure 2:
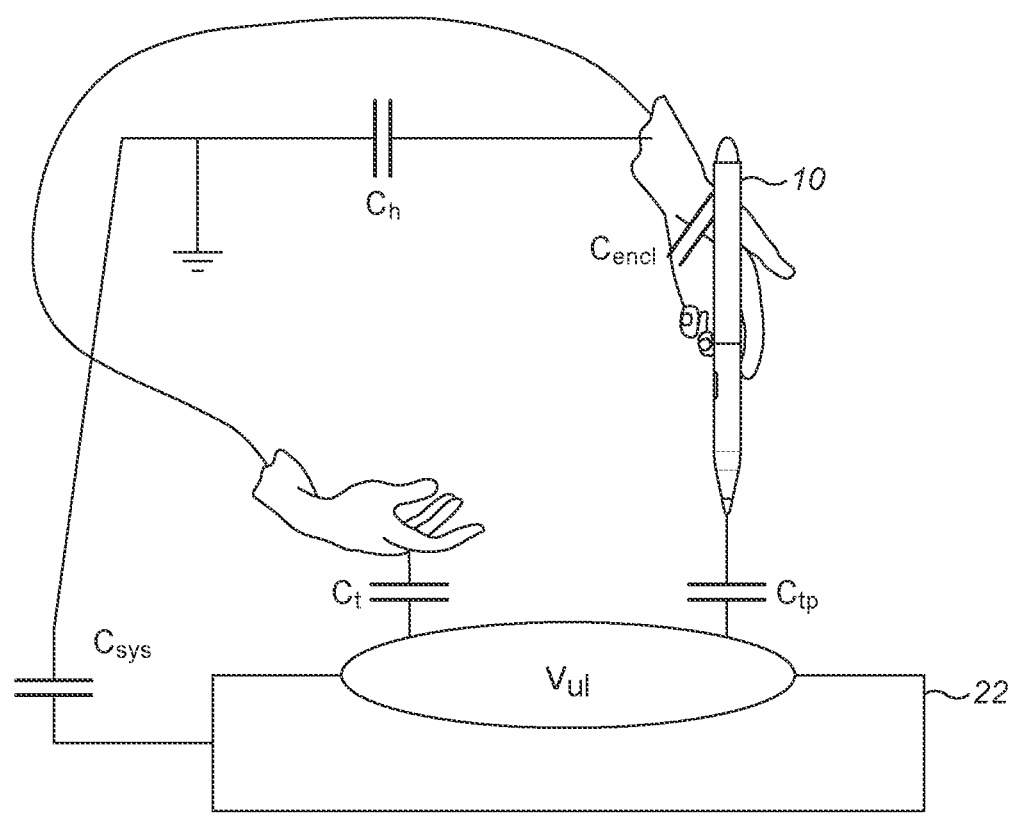
FIG. 2 is a schematic diagram that indicates a capacitive effect of an ungrounded touch e.g. by a palm of a user on an uplink signal.

FIG. 2 is a schematic diagram that indicates a capacitive effect of an ungrounded touch e.g. by a palm of a user on an uplink signal.

The uplink signal is degraded when a user palm touches the touch screen 22 and the host device is ungrounded, which affects data transfer from the digitizer to the stylus 10 and leads to a degradation of stylus performance.

Usually, when a user writes on the touch screen 22, his palm rests on the surface digitizer (palm mode) of the touch screen 22 without gripping the chassis of the host device, so that the host device is in the floated mode. Then, as indicated in FIG. 2, a first component of the uplink signal $V_{ul}$ is coupled via a tip capacitance $C_{tp}$ (e.g. 0.1 pF) to the tip electrode of the stylus 10. Additionally, a second component of the uplink signal $V_{ul}$ is coupled via a touch capacitance $C_t$ (e.g. 30 pF for a touch by a palm and 150 pF for a touch by two hands) to the palm of the user and then via an enclosure capacitance $C_{encl}$ (e.g. 1000 pF) to the housing of the stylus 10. Furthermore, the user body is coupled via a human capacitance (e.g. 100 pF) to ground and the host device is coupled via a system capacitance $C_{sys}$ (e.g. 20 pF in case of a 13" touch screen) to ground.

Thus, the second component of the uplink signal $V_{ul}$ induces a voltage on the stylus 10 via the user resting his palm or hand(s) on the touch screen 22 and holding the stylus 10, which leads to a degraded voltage difference between the stylus 10 and the touch screen 22 by the following touch-dependent factor f:

$$f = \frac{C_h C_{sys}}{C_h C_{sys} + (C_h + C_{sys})C_t} \quad (1)$$

Thus, the uplink signal transmitted from the digitizer of the host device (i.e. touch sensor) to the stylus 10 is reduced proportional to the touch area of the palm, hand or other body portion of the user.

Figure 3:
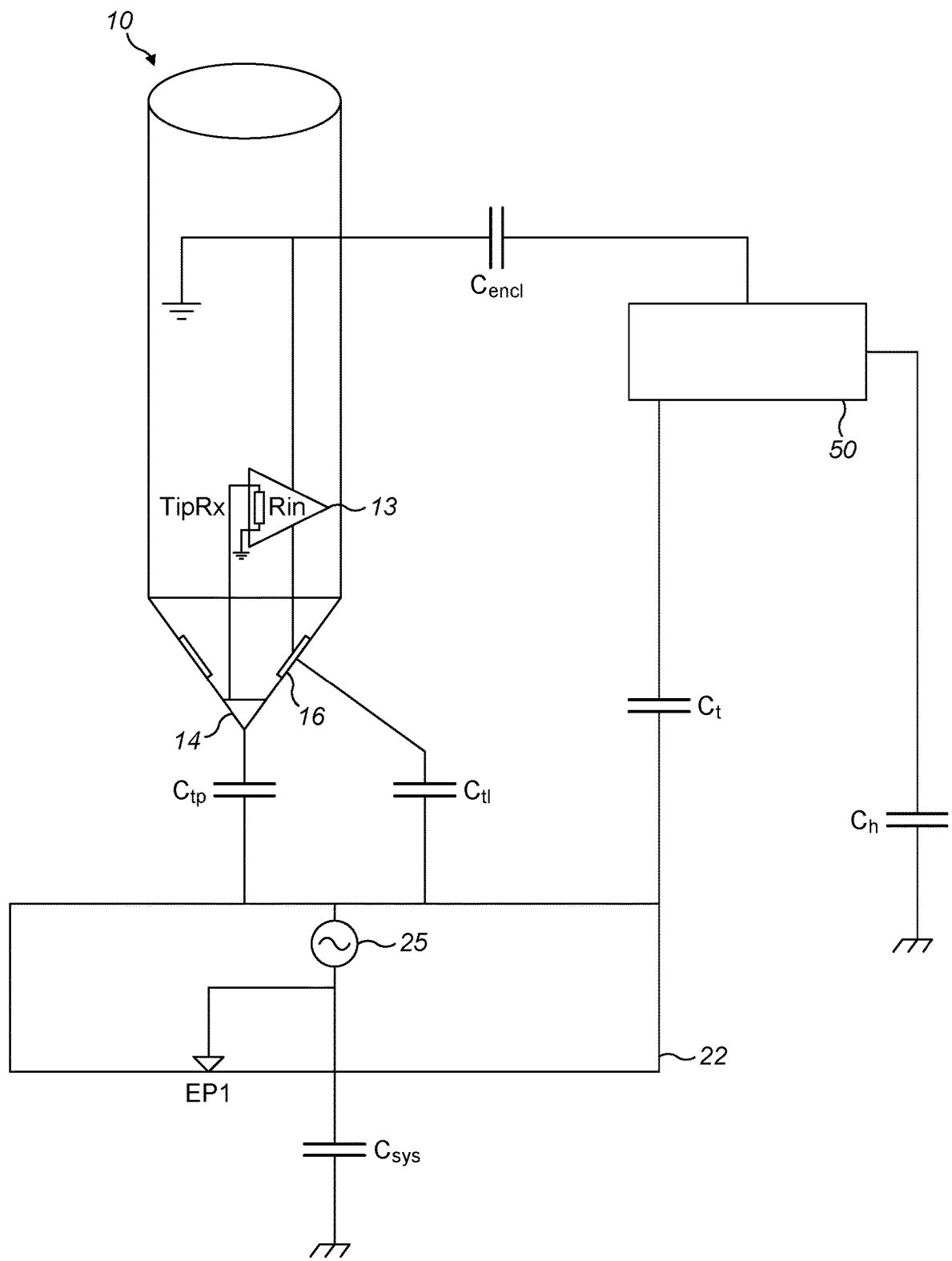
FIG. 3 is schematic block diagram indicating capacitances that influence the strength of an uplink signal during a body touch on a touch screen.

FIG. 3 is a more detailed schematic block diagram indicating capacitances and their influence on the strength of the uplink signal during a body touch on the touch screen 22 in an ungrounded or floating mode.

The tip electrode 14 of the stylus 10 may be formed of a conductive material such as a metal, or the like, and protrudes outwardly from one side of the housing to serve as an input/output electrode. Since the tip electrode 14 serves as an input/output electrode, the structure of the stylus 10 is advantageously simplified. When the tip electrode 14 touches the touch screen 22 of the host device, the tip electrode 14 is capacitively coupled to the touch screen 22 in the contact point. The tip electrode 14 receives a touch screen driving signal (uplink signal) from the touch screen 22 at the contact point and outputs a pen driving signal (downlink signal) produced within the stylus 10 to the contact point of the touch screen 22. When the tip electrode 14 touches the touch screen 22 of the host device 20, a input/output unit (not shown) of the stylus 10 electrically connects the tip electrode 14 and a tip receiver (e.g. amplifier) 12 during a reception period, and electrically connects the tip electrode 14 and a transmission unit (not shown) during a transmission period to thereby temporally separate a reception timing of the uplink signal (touch screen driving signal) and a transmission timing of the downlink signal (pen driving signal).

As mentioned above in connection with FIG. 2, a body touch on the touch screen 22 of the host device e.g. by the hand 50 of a user may reduce the strength of the uplink signal received at the tip receiver 12 via the tip electrode 14 and a tip capacitance $C_{tp}$ of the stylus 10. The uplink signal is generated at a touch screen driver 25 of the touch screen 22. Especially, when the host device (e.g. a personal computer) is in a battery mode or connected to the grid via a 2-prong plug without a connector to earth potential EP1, the ground of the touch screen 22 and its digitizer in an in-cell configuration is only coupled to the ground through a system-to-ground capacitance $C_{sys}$. The hand 50 of a user of the stylus is coupled to the touch screen 22 through a palm capacitance $C_t$ and to earth trough a hand-to-ground capacitance $C_h$. Additionally, the stylus ground (i.e. enclosure) is coupled to the hand 50 of the user via a hand-to-enclosure capacitance Cenci while holding the stylus 10.

Thus, when the user touches the touch screen 22 via his/her hand 50, some of the uplink signal is coupled via the human body of the user and the stylus housing to the stylus ground, which reduces the net input signal received at an amplifier of the stylus 10.

In the following, an example of a calculation of the dependence of the uplink signal at the tip electrode 14 of the stylus 10 from the parasitic capacitances indicated in FIG. 2 is explained in more detail.

The hand potential $V_h$ at the hand 50 of the user with reference to the potential $V_{ul}$ of the touch screen 22 can be expressed as follows:

$$V_h = -V_{ul} * C_t/(C_{sys} + C_t) \quad (2)$$

Using the above equation (2), the current $I_t$ of the uplink signal at the tip electrode 14 can then be expressed as follows:

$$I_t = -(V_{ul} - V_h)C_{tp}s \quad (3)$$

$$I_t = -V_{ul}(1 - C_t/(C_{sys} + C_t))C_{tp}s \quad (4)$$

wherein s denotes the complex frequency.

For a typical case where $C_t = 10$ pF and $C_{sys} = 5$ pF, an attenuation of the uplink signal by a factor of 0.33 (or −10 dB) is thus obtained.

To mitigate the problem of reduced uplink signal due to a body touch, a selective uplink signal modification approach at the touch area is suggested in embodiments, by which the uplink signal from the touch screen driver 25 to the stylus 10 is temporarily and area selectively modified to compensate for the signal reduction during a body touch at the touch screen 22.

Figure 4:
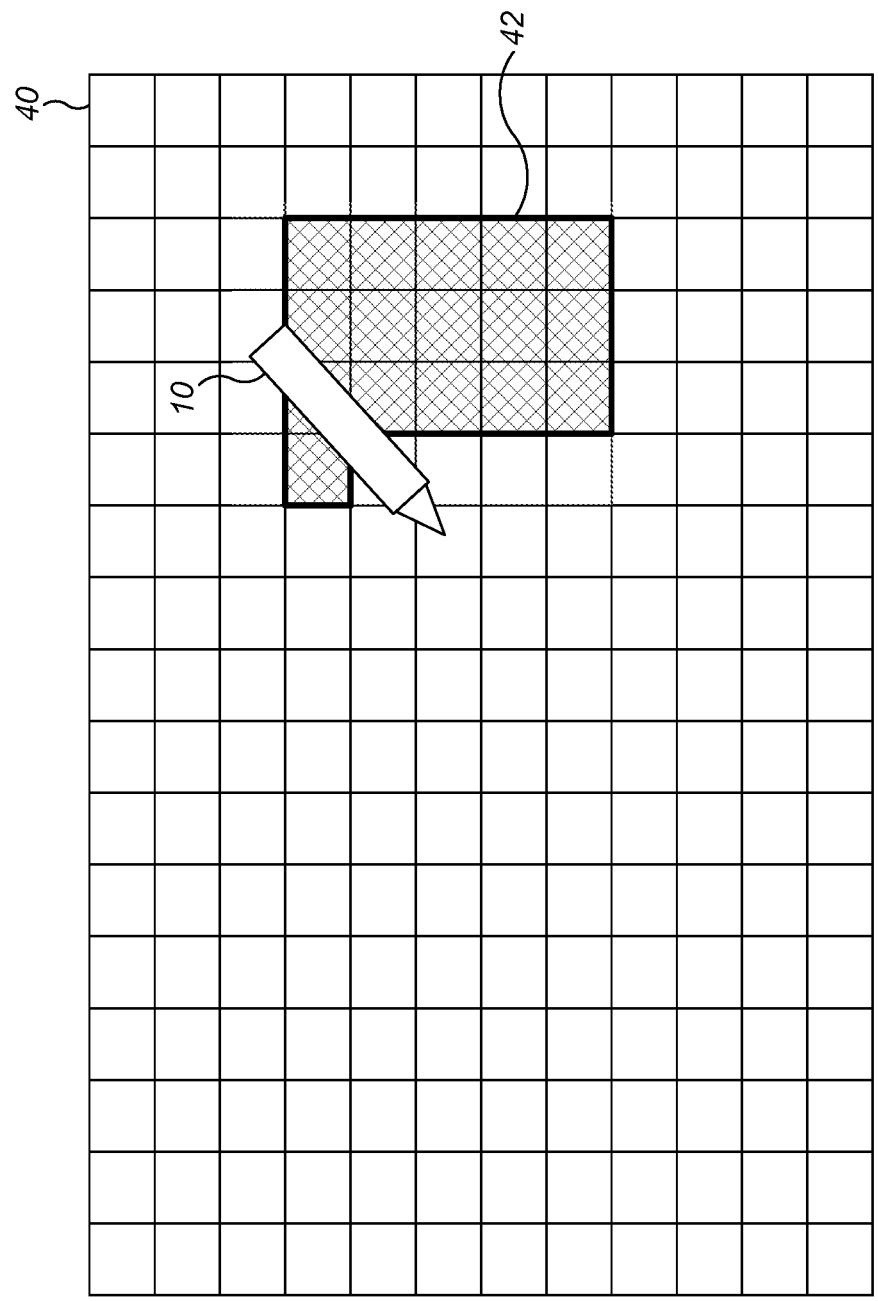
FIG. 4 is a schematic diagram indicating a body touch area in an in-cell configuration.

FIG. 4 is a schematic diagram indicating a body touch area in an in-cell configuration.

In an in-cell configuration, touch sensing elements (e.g. touch sense cells or pixel pads or touch antennas) 40 of a touch sensor of the digitizer are directly integrated into one or more layers of the display stack of the touch screen itself. Thereby, the touch sensor substrate can be removed by combining display cells of the touch screen display and the touch sensing elements into a single structure, allowing touch screen devices to become thinner and lighter.

The touch screen driver of the host device is configured to apply the same uplink signal to all touch sensing elements 40. However, when the hand of a user holding the stylus 10 touches the touch screen, the interfering second component of the uplink signal is transferred to the stylus 10 via a touch area 42, as explained with reference to FIGS. 2 and 3.

Therefore, to solve the signal interference problem caused by the touch area 42, it is proposed to detect the touch area 42 (which may consist of a plurality of touch sensing elements that have detected the touch), and to control the touch screen driver to selectively apply an antiphase uplink signal to the touch sensing cells 40 within the touch area 42 (e.g. the selective area under the palm area), to thereby increase the overall induced signal collected by the stylus 10 from the digitizer-to-stylus path (first component) and the palm-to-stylus path (second component). The remaining area of the touch screen is driven with a non-amended uplink signal. The antiphase uplink signal can be obtained by applying a phase difference (e.g. substantially 180°) that results in a positive (i.e. enhancing or amplifying) combination of the above first and second components of the uplink signal at the tip receiver of the stylus 10.

Figure 5:
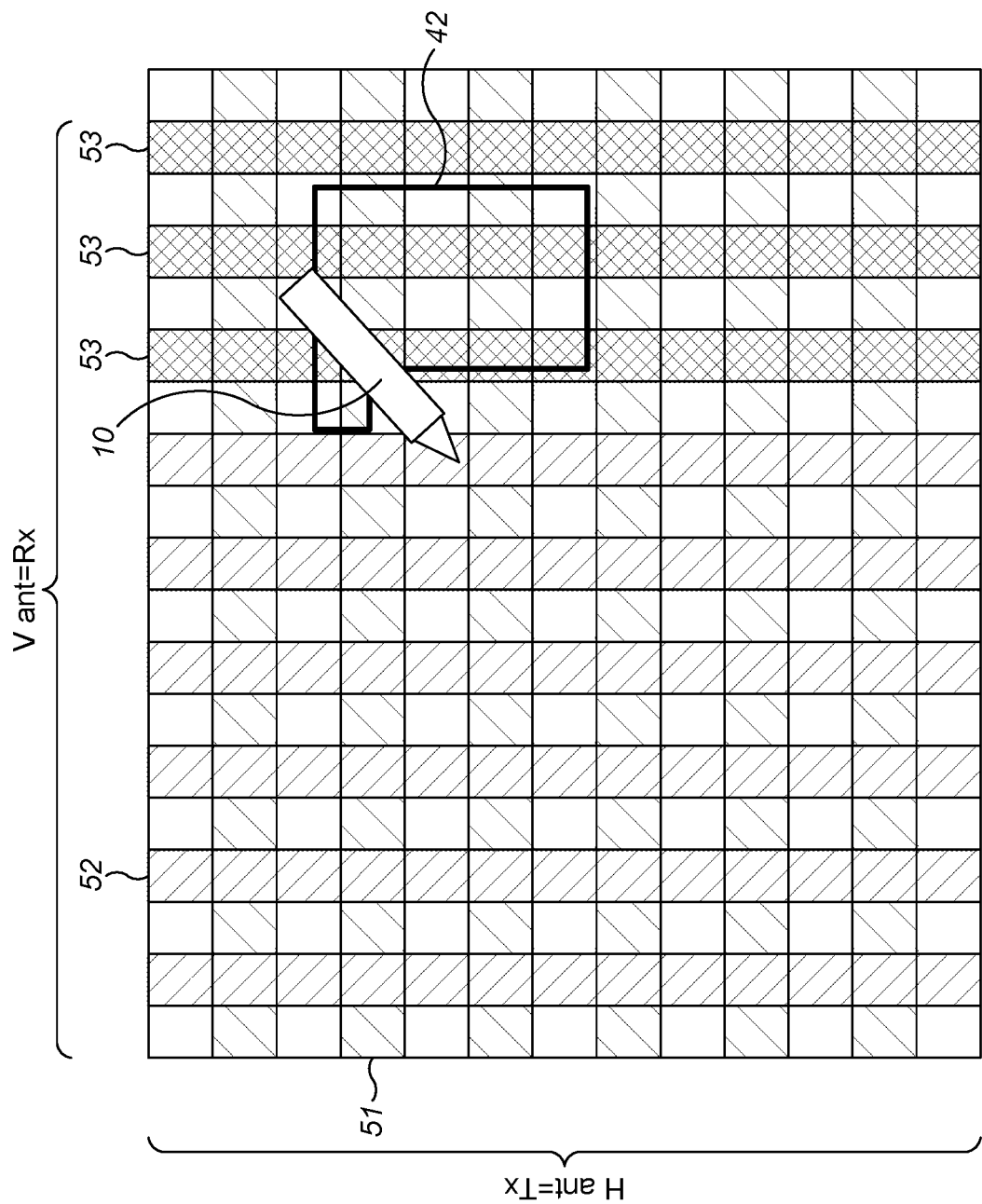
FIG. 5 is a schematic diagram indicating a body touch area in an out-cell configuration.

FIG. 5 is a schematic diagram indicating a body touch area in an out-cell configuration with a separate touch sensor layer.

In an out-cell or on-cell configuration, the touch sensor of the digitizer is patterned (e.g. as a sensor matrix) on the top side, facing users, of the touch screen.

More specifically, in the example of FIG. 5, a pattern of vertical electrode lines (antennas $V_{ant}$) 52 and horizontal electrode lines (antennas $H_{ant}$) 51 forms a sensor matrix. The vertical electrode lines 52 may be used for receiving (Rx) and the horizontal electrode lines 51 may be used for transmitting (Tx) signals between the host device and the stylus 10.

The touch screen driver of the host device is configured to apply the same uplink signal to all vertical and horizontal electrode lines 52, 51.

To solve the signal interference problem caused by the touch area 42 in the out-cell or on-cell configuration of FIG. 5, it is proposed to detect the touch area 42 (which may consist of a plurality of touch sensing elements that have detected the touch), and to control the touch screen driver to selectively apply an antiphase uplink signal e.g. to selected vertical electrode lines 53 within the touch area 42 (e.g. the selective area under the palm area), to thereby increase the overall induced signal collected by the stylus 10 from the digitizer-to-stylus path (first component) and the palm-to-stylus path (second component). The remaining horizontal and vertical electrode lines of the touch screen can be driven with a non-amended uplink signal. Again, the antiphase uplink signal can be obtained by applying a phase difference (e.g. substantially 180°) that results in a positive (i.e. enhancing or amplifying) combination of the above first and second components of the uplink signal at the tip receiver of the stylus 10.

Figure 6:
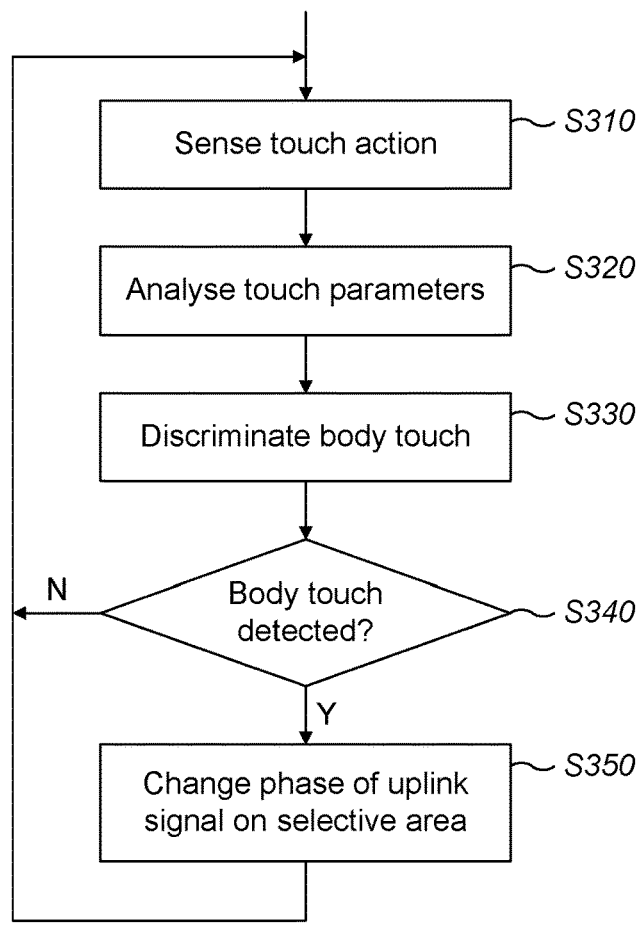
FIG. 6 is a schematic flow diagram of an uplink signal control procedure that considers a body touch.

FIG. 6 is a schematic flow diagram of an uplink signal control procedure that considers a body touch.

An initial sensing operation S310 detects parameters of a touch action at the touch screen 22. This can be achieved by analysing touch row data according to a touch sensor driving signal and the downlink signal of the stylus 10 to obtain touch parameters (e.g. capacitance, position, phase, amplitude, single-touch, multi-touch etc.).

More specifically, the touch screen 22 may be implemented as a capacitive touch screen sensing a touch input through a plurality of capacitance sensors, wherein capacitance may be classified as self-capacitance and mutual capacitance. The self-capacitance may be formed along a conductor line of a single layer formed in one direction. The mutual capacitance may be formed between two conductor lines perpendicular to each other. The touch sensor may be implemented by mutual capacitance sensors that may include transmission (Tx) electrode lines (e.g. horizontal electrode lines 51 of FIG. 5), reception (Rx) electrode lines (e.g. vertical electrode lines in FIG. 5) intersecting with the Tx electrode lines, and touch sensors formed at intersections of the Tx electrode lines and the Rx electrode lines. The Tx electrode lines are driving signal lines supplying electric charges to the touch sensors by applying the touch sensor driving signal (and/or the downlink signal of the stylus 10) to the touch sensors. The Rx electrode lines are sensor lines connected to the touch sensors and supplying electric charges of the touch sensors to a touch driving device. In a mutual capacitance sensing method, electric charges are supplied to the touch sensor by applying the touch sensor driving signal (and/or the downlink signal) to the Tx electrodes through the Tx electrode lines, and a change in capacitance of the touch sensors is sensed through Rx electrodes and the Rx electrode lines in synchronization with the touch sensor driving signal (and/or the stylus downlink signal), whereby a touch input by a conductive object may be recognized.

Then, a touch analysis operation S320 is performed to analyse at least one touch parameter. In an example, the touch sensing system of the digitizer of the touch screen 22 may simultaneously sense two touch inputs, e.g., a body touch input by a body part (e.g. finger or palm) of a user and a stylus touch input by the stylus 10. The body touch input may be sensed on the basis of an analysis result of the touch row data according to the touch sensor driving signal, and the pen touch input may be sensed on the basis of an analysis result of touch row data according to the downlink signal of the stylus 10.

In a subsequent discrimination or detection operation S330, the analyzation result of the touch parameters is used to detect a body touch and a related body touch area (e.g. touch area 42 in FIGS. 4 and 5) during a concurrent stylus touch by discriminating between a stylus touch and a body touch. As an example, the downlink signal of the stylus 10 and the touch sensor driving signal of the digitizer may have the same phase but the magnitude (e.g. pulse amplitude) of the downlink signal may be set to be greater than that of the touch sensor driving signal, whereby the touch row data of the position that the stylus 10 has touched and the touch row data of the position that the body of the user has touched are differentiated to easily distinguish between the stylus touch input and the body touch input (to thereby detect the concurrent body touch).

Then, in a subsequent decision operation S340, it is decided whether a body touch has occurred (i.e. has been detected) and a compensation is required to adjust the uplink signal. If no adjustment is required, the procedure jumps back to the sense operation S310 and starts again. Otherwise, if an adjustment is required (e.g. if a body touch has been detected), the procedure proceeds to a compensation operation S350 where the phase of the uplink signal is changed to obtain an antiphase uplink signal which is area selectively applied (e.g. by the touch screen driver) to specific electrode lines 53 or cells 40 at the detected body touch area 42 to compensate for the uplink signal reduction due to the detected body touch.

As regards the touch sensor configurations of FIGS. 4 and 5, the in-cell configuration of FIG. 4 with sensing elements 40 (e.g. in a pixel pad antenna design) provides a higher number of sensing elements 40 at the touch area 42 that can drive the antiphase uplink signal, as compared to the outcell/on-cell configuration of FIG. 5. In the outcell/on-cell configuration, the width or space between the electrode lines 51, 52 (i.e. antenna width/space) and resulting pitch (e.g. 4 mm) of the sensor matrix design allows for wider electrode lines 51, 52 and improved uplink antiphase signals, while a small pitch can help to better localize the touch area 42 and apply a more effective uplink antiphase signal.

The operations of FIG. 3 may be continuously or intermittently repeated.

Figure 7:
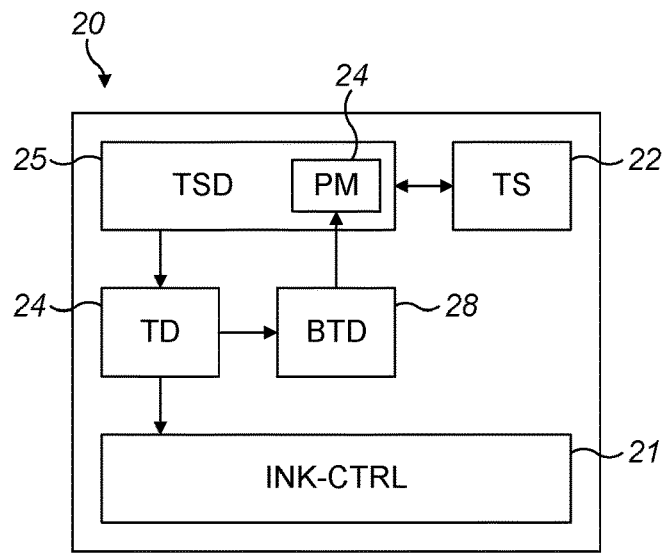
FIG. 7 is a schematic block diagram of an example system with selective uplink signal modification at a host device.

FIG. 7 is a schematic block diagram of an example system with selective uplink signal modification at a host device 20.

As explained above, the adaptive and area selective uplink signal modification can be achieved by locally applying an antiphase signal to individual touch sensor elements at the determined location and/or area of the detected body touch to thereby achieve a positive combination of the first and second components of the uplink signal at the tip receiver of the stylus. In the example of FIG. 3, the first component with the regular phase is received at one input of a differential amplifier of the tip receiver 12 and the second component with the antiphase is received at the other input of the differential amplifier. The differential amplifier amplifies the difference of the two components so that the amplified output signal will increase.

In the absence of any body touch, the normal uplink signal is transmitted from all sensor elements of the touch sensor on the touch screen 22 to improve the capacitance to the tip electrode 14 of the stylus 10 (e.g. when the stylus 10 hovers above the touch screen 22).

According to FIG. 7, the host device 20 comprises a touch screen 22 and a touch screen driver (TSD) 25 which controls a touch sensor (e.g. an array or matrix of sensor elements or antennas) of the touch screen 22. The touch screen driver 25 applies a touch screen driving signal to the sensor elements of the touch sensors and senses the amount of change in the charge of the sensor elements to determine a touch input. The touch screen driving signal includes the uplink signal and a touch sensor driving signal.

Furthermore, the touch screen driver 25 analyses charge variations of the touch sensor depending on the presence or absence of a touch input, determines or detects the touch input, and calculates coordinates of the touch input position.

The touch screen 22 may be configured as an in-cell liquid crystal display (LCD) panel that also includes a touchscreen functionality by positioning at least one of the touch layers (typically a transmit (TX) layer) under a color filter glass. Furthermore, typically the TX layer is shared with a common electrode (reference layer) of the touch screen 22. The touch screen driver 25 may be a capacitive touch screen driver that is used to measure the capacitance on the array of electrodes (sensor elements), such as an array including multiple transmit (TX) electrodes and multiple receive (RX) electrodes. An integrated circuit of the is typically the integrated circuit (IC) positioned on the substrate glass of the LCD which drives the timing and video signals to the LCD. While the above description is for in-cell LCD, similar stack-ups exist for other display types, such as active-matrix organic light-emitting diode (AMOLED).

Based on the sensor signals generated by the touch screen driver 25, a touch detector 24 detects touch parameters of touch actions as described above in connection with the sensing operation S310 of FIG. 6.

Additionally, the downlink signal received by the touch detector 24 from the touch screen driver 25 is forwarded to an ink control (INK-CTRL) application or unit (e.g. a drawing application or unit) 21, where it is utilized to generate digital ink at a determined location of the stylus 10 with a weight (e.g., thickness or darkness) or other ink parameter corresponding to a reported force, pressure or inking level included in the downlink signal.

The touch parameters determined by the touch detector 24 are provided to a body touch detector (BTD) 28 of the digitizer, which is configured to identify a location of a body portion (e.g. hand or finger) on the touch screen as described above in connection with the touch analysis and discrimination or detection operations S320 and S330 of FIG. 6. Based on the identified location (e.g. touch area 42 of FIGS. 4 and 5) of a detected body touch, the body touch detector 28 controls the touch screen driver 25 so that selected sensor elements of the touch sensor at or around the location the detected body touch are supplied with an antiphase signal to thereby reduce the amount of uplink signal loss via the partial uplink channel path of the second component through the capacitance $C_r$.

As an example, the body touch detector 28 of the digitizer may initiate a control operation by the touch screen driver 25 to change the phase of the uplink signal at the selected sensor elements by connecting them to an output of a phase shifting circuit (not shown) to thereby couple the antiphase uplink signal to the body portion of the user.

The phase shifting circuit or function may be implemented by a simple inverter or inverting amplifier which inverts the input signal so that an antiphase signal with 180° phase difference is achieved. In case a more specific phase difference is required to apply a phase correction for path differences, the phase shifting circuit may be configured as discrete circuitry or integrated circuit or digital processor circuit for achieving the desired phase shift.

The touch detector 24, the touch screen driver 25, the body touch detector 28, the ink control unit or application 21 and other system components of the host device 20 may be implemented in an application specific integrated circuit (ASIC), a system on chip (SOC), a field programmable gate array (FPGA), a micro-processing unit, etc.

In another embodiment, the proposed area selective conversion of the uplink signal may be used in a system (e.g. laptop or notebook) comprising a touch screen and a trackpad that supports an active stylus as input device. The trackpad may be operated in synchronism with digitizer. A user that writes on the digitizer of the touch screen while his/her arm touches the trackpad will create the same interference problem by an uplink signal component forwarded via the trackpad. The same applies vice versa when the user uses the active stylus on the trackpad and touches the touchscreen with his/her hand or another body portion.

To solve this similar problem, it is suggested to apply an antiphase uplink signal to the trackpad always or when a body touch is detected at the touch screen. As an alternative, the antiphase uplink signal can be applied to the whole touch screen when a body touch is detected at the trackpad.

To summarize, the effect of a contact by a hand or other body part of a user with a touch screen (while holding an input device (e.g. stylus or eraser or the like)) on the strength of a capacitively coupled uplink signal provided to the input device by a host device is mitigated by detecting and/or discriminating the body touch and modifying the uplink channel in a selected area to compensate the effect on the uplink signal. The compensation can be achieved by applying an antiphase signal on a selective contact area (e.g. under a palm area), to increase an overall induced signal collected by the input device from digitizer-to-pen and palm-to-pen paths.

It will be appreciated that the above embodiments have been described by way of example only. The invention can be applied to any type of touch screen system with any type of input device that may involve a body touch of a user. The touch screen 22 may be implemented on the basis of a liquid crystal display (LCD), a field emission display (FED), a plasma display panel (PDP), an organic light emitting display device, an electrophoresis display, and the like.

More generally, according to a first aspect disclosed herein, there is provided an apparatus for controlling transmission of an uplink signal from a host device of a touch-sensitive device to a touch input device, the apparatus comprising:
 a touch detector for detecting a body touch on the touch-sensitive device by a user body portion; and
 an uplink signal modulator for changing a phase angle of the uplink signal to obtain an antiphase signal; and
 a driver circuit for selectively applying the antiphase signal to a body touch area in response to a detected body touch.

In embodiments, the driver circuit may be configured to determine a touch area of the body touch on the touch screen and to apply the antiphase signal locally at the determined touch area in response to the detected body touch.

In embodiments, the driver circuit may be configured to apply the uplink signal without any phase change to a remaining area of the touch screen excluding the determined touch area.

In embodiments, the driver circuit may be configured to apply the antiphase signal to selected sensor elements of a touch sensor of the touch screen within the determined touch area.

In embodiments, the driver circuit may be configured to change the phase of the uplink signal at the selected sensor elements by connecting them to an output of a phase shifting circuit to which the uplink signal is supplied as input signal.

In embodiments, the phase shifting circuit may comprise an inverter which inverts the uplink signal to obtain the antiphase signal.

In embodiments, the selected sensor elements may be electrode lines of an out-cell configuration or sensor cells of an in-cell configuration.

In embodiments, the phase difference between the antiphase signal and the uplink signal may be selected to result in a positive combination of the uplink signal and the antiphase signal at an input receiver of the touch input device.

According to a second aspect disclosed herein, there is provided a host device or digitizer comprising an apparatus of the first aspect and a touch-sensitive device.

In an embodiment, the touch-sensitive device comprises a touch screen, wherein the touch input device comprises a stylus.

In an embodiment, the host device comprises a trackpad, wherein the body touch area corresponds to the trackpad and the touch input device comprises a stylus.

In an embodiment, the body touch area is located on the touch-sensitive device or on the trackpad.

According to another aspect disclosed herein, there is provided a method of controlling transmission of an uplink signal from a host device of a touch-sensitive device to a touch input device, the method comprising:
  detecting a body touch on the touch-sensitive device by a user body portion;
  changing a phase angle of the uplink signal to obtain an antiphase signal; and
  selectively applying the antiphase signal to a body touch area in response to a detected body touch.

According to another aspect disclosed herein, there is provided a computer program embodied on computer-readable storage and comprising code configured so as when run on one or more processors to perform the method of any embodiment disclosed herein.

Examples and embodiments described herein may be implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system used for implementation. Accordingly, logical operations making up examples or embodiments described herein may be referred to variously as operations, steps, objects, or modules. Furthermore, it should be understood that logical operations may be performed in any order, adding and omitting as desired, unless explicitly claimed otherwise or a specific order is inherently necessitated by the claim language.

Other variants and applications of the disclosed techniques may become apparent to a person skilled in the art once given the present disclosure. The scope of the present disclosure is not limited by the above-described embodiments but only by the accompanying claims.

The invention claimed is:

1. A host device comprising:
  a touch-sensitive display device; and
  wherein the host device is configured for controlling transmission of an uplink signal from the touch-sensitive display device to a touch input device, the host device comprising:
    a touch detector for detecting a body touch of a user body portion on the touch-sensitive display device; and
    a touch screen driver for changing a phase angle of the uplink signal to obtain an antiphase uplink signal, wherein the antiphase uplink signal is selectively applied locally to an area of the detected body touch and the uplink signal is driven to an entirety of a remaining area on the touch-sensitive display device that excludes the area of the detected body touch during display of digital ink on the touch-sensitive display device.

2. The host device of claim 1, wherein a phase difference between the antiphase uplink signal and the uplink signal is selected to result in a positive combination of the uplink signal and the antiphase uplink signal at an input receiver of the touch input device.

3. The host device of claim 1, wherein a phase difference between the antiphase uplink signal and the uplink signal is approximately 180°.

4. The host device of claim 1, wherein the touch screen driver is configured to invert the uplink signal to obtain the antiphase uplink signal.

5. The host device of claim 1, wherein the touch screen driver is configured to determine a touch area of a body touch on a trackpad and to apply the antiphase uplink signal to the trackpad locally at the determined touch area.

6. The host device of claim 1, wherein the touch screen driver is configured to determine a touch area of a body touch on a trackpad and to apply the antiphase uplink signal to the trackpad locally at the determined touch area, the touch screen driver being configured to apply the uplink signal to a remaining area of the trackpad excluding the determined touch area.

7. The host device of claim 1, wherein the touch-sensitive display device comprises a touch screen and the touch screen driver is configured to at least one of:
  apply the antiphase uplink signal to a trackpad always.

8. The host device of claim 1, wherein the touch input device comprises a stylus.

9. The host device of claim 1, wherein the touch screen driver is configured to apply the antiphase uplink signal to a whole of the touch-sensitive display device when a body touch is detected at a trackpad.

10. The host device of claim 1, wherein the host device comprises at least one of: a smart phone, a tablet, a watch, a desktop computer, a gaming device, a wearable device, a television, a video conferencing system, a laptop, or a notebook.

11. The host device of claim 1, wherein the area of the detected body touch is a first area of a first detected body touch, wherein the antiphase uplink signal is selectively applied locally to a second area of a second detected body touch, and the uplink signal is driven to the entirety of the remaining area on at least one of the touch-sensitive display device or a trackpad that excludes the area of the detected body touch, during a detected touch by the touch input device.

12. The host device of claim 1, wherein the touch screen driver is configured to at least one of:
  apply the antiphase uplink signal to a trackpad when the body touch is detected at the touch-sensitive display device, or
  apply the antiphase uplink signal to the touch-sensitive display device when a body touch is detected at the trackpad.

13. A method of controlling transmission of an uplink signal from a touch screen to a touch input device, the method comprising:
  detecting a body touch of a user body portion on the touch screen; and
  changing a phase angle of the uplink signal from the touch screen to the touch input device to obtain an antiphase uplink signal, wherein the antiphase uplink signal is selectively applied locally to an area of the detected body touch, and wherein an entirety of a remaining area on the touch screen that excludes the area of the detected body touch is driven by the uplink signal during display of digital ink on the touch screen.

14. The method of claim 13, wherein a phase difference between the antiphase uplink signal and the uplink signal is selected to result in a positive combination of the uplink signal and the antiphase uplink signal at an input receiver of the touch screen.

15. The method of claim 13, further comprising:
  determining a touch area of a body touch on a trackpad; and
  applying the antiphase uplink signal to the trackpad locally at the determined touch area.

16. The method of claim 13, further comprising:
  determining a touch area of a body touch on a trackpad;
  applying the antiphase uplink signal to the trackpad locally at the determined touch area; and
  applying the uplink signal to a remaining area of the trackpad excluding the determined touch area.

17. The method of claim 13, further comprising applying the antiphase uplink signal to a trackpad when a body touch is detected at the touch screen.

18. A non-transitory computer-readable storage medium comprising code configured, when executed on one or more computer processors, to:
  detect, using a touch detector a body touch of a user body portion on a touch screen; and
  change, using a touch screen driver, a phase angle of an uplink signal from the touch screen to a touch input device to obtain an antiphase uplink signal, wherein the antiphase uplink signal is selectively applied locally to an area of the detected body touch and the uplink signal is driven to an entirety of a remaining area on the touch screen that excludes the area of the detected body touch during display of digital ink on the touch screen; and
  apply the antiphase uplink signal at least one of:
    to a trackpad always;
    to the trackpad when a body touch is detected at the touch screen; or
    to the touch screen when a body touch is detected at the trackpad.

19. The non-transitory computer-readable storage medium of claim 18, wherein a phase difference between the antiphase uplink signal and the uplink signal is approximately 180°.

20. The non-transitory computer-readable storage medium of claim 18, wherein the code is configured, when executed on the one or more computer processors, to apply the antiphase uplink signal at least one of:
  to a trackpad always;
  to the trackpad when a body touch is detected at the touch screen; or
  to the touch screen when a body touch is detected at the trackpad.

* * * * *